US011630561B2

(12) United States Patent
Li

(10) Patent No.: US 11,630,561 B2
(45) Date of Patent: Apr. 18, 2023

(54) IMAGE EDITING METHOD AND TERMINAL

(71) Applicant: VIVO MOBILE COMMUNICATION CO., LTD., Guangdong (CN)

(72) Inventor: Haozheng Li, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/491,027

(22) Filed: Sep. 30, 2021

(65) Prior Publication Data

US 2022/0019345 A1 Jan. 20, 2022

Related U.S. Application Data

(63) Continuation of application No. PCT/CN2020/081030, filed on Mar. 25, 2020.

(30) Foreign Application Priority Data

Apr. 1, 2019 (CN) ......................... 201910257242.1

(51) Int. Cl.
*G06F 3/048* (2013.01)
*G06F 3/04845* (2022.01)
(Continued)

(52) U.S. Cl.
CPC ...... *G06F 3/04845* (2013.01); *G06F 3/04842* (2013.01); *G06F 3/1423* (2013.01)

(58) Field of Classification Search
CPC ............. G06F 3/04845; G06F 3/04842; G06F 3/1423; H04N 1/0044; G06K 15/1807
See application file for complete search history.

(56) References Cited

U.S. PATENT DOCUMENTS 9,704,231 B1 * 7/2017 Kulewski ............... G06V 20/10
2003/0038832 A1 * 2/2003 Sobol ................. H04N 1/00458 715/722

(Continued)

FOREIGN PATENT DOCUMENTS

CN 106651761 A 5/2017
CN 107909634 A 4/2018
CN 11007837 A 7/2019

OTHER PUBLICATIONS

Adam Lerner, Adobe Lightroom Tips, Dual Monitor Editing, Oct. 17, 2011—https://www.youtube.com/watch?v=S_6NvDJDKa8 (Year: 2011).*

(Continued)

*Primary Examiner* — Mahelet Shiberou
(74) *Attorney, Agent, or Firm* — Maschoff Brennan

(57) ABSTRACT

An image editing method and a terminal are provided. The terminal includes a first screen and a second screen. The image editing method includes: receiving a first input in a case that the first screen displays a first image; and in response to the first input, performing first processing on the first image to obtain a second image, displaying the second image on the first screen, and displaying the first image and/or a third image on the second screen; where the third image is an image obtained by performing second processing on the first image, and the second processing is a part of a processing process included in the first processing.

15 Claims, 9 Drawing Sheets

2 4 7 5
1 2 3
Editing record of number 3:
Filter 3→sticker 2→thin face 10% → big eyes 5%
Filter Sticker
Filter 1 Filter 2 Filter 3

(51) Int. Cl.
*G06F 3/04842* (2022.01)
*G06F 3/14* (2006.01)

(56) References Cited

U.S. PATENT DOCUMENTS

2007/0035616 A1* 2/2007 Lee .................... H04N 1/00424 358/527
2009/0231352 A1* 9/2009 Bhatt .................. G06F 3/04847 345/581
2010/0182265 A1* 7/2010 Kim ...................... G06F 1/1641 345/1.3
2017/0286385 A1* 10/2017 Hastings ............... G06F 40/197
2018/0316637 A1 11/2018 Desjardins
2021/0200329 A1* 7/2021 Zhang ................... G06F 1/3218

OTHER PUBLICATIONS

International Search Report and Written Opinion dated Oct. 14, 2021 as received in application No. PCT/CN2020/081030.
"[Share] Teach you to use your mobile phone to remove the sundries on the photos in one minute" Retrieved Mar. 21, 2022.

* cited by examiner

IMAGE EDITING METHOD AND TERMINAL

CROSS-REFERENCE OF RELATED APPLICATION

This application is continuation application of PCT International Application No. PCT/CN2020/081030 filed on Mar. 25, 2020, which claims priority to Chinese Patent Application No. 201910257242. 1 filed in China on Apr. 1, 2019, the disclosures of which are incorporated herein by reference in their entireties.

TECHNICAL FIELD

The present disclosure relates to the field of communication technologies, and in particular, to an image editing method and a terminal.

BACKGROUND

As mobile terminals such as mobile phones are widely used, mobile phones have more and more functions. A picture editing function is widely used in photo processing.

In an image processing process in related technologies, usually, several image editing operations are performed on an image, and then the image is stored. Then, the image editing process ends and the stored image exists in an album. When processing is required to obtain an ideal image, the foregoing processing process usually needs to be repeated for several times, and finally the album is opened to swipe images in the album to view different image processing effects. The operation is complicated and the image editing processing process is very inconvenient.

SUMMARY

The embodiments of the present disclosure provide an image editing method and a terminal.

The present disclosure is implemented as follows:

According to a first aspect, the embodiments of the present disclosure provide an image editing method, applied to a terminal, where the terminal includes a first screen and a second screen, and the image editing method includes:

receiving a first input in a case that the first screen displays a first image; and in response to the first input, performing first processing on the first image to obtain a second image, displaying the second image on the first screen, and displaying the first image and/or a third image on the second screen;

where the third image is an image obtained by performing second processing on the first image, and the second processing is a part of a processing process included in the first processing.

According to a second aspect, the embodiments of the present disclosure further provide a terminal. The terminal has a first screen and a second screen, and the terminal further includes:

a first receiving module, configured to receive a first input in a case that the first screen displays a first image; and a first display module, configured to: in response to the first input, perform first processing on the first image to obtain a second image, display the second image on the first screen, and display the first image and/or a third image on the second screen;

where the third image is an image obtained by performing second processing on the first image, and the second processing is a part of a processing process included in the first processing.

According to a third aspect, the embodiments of the present disclosure further provide a mobile terminal, including a processor, a memory, and a computer program stored in the memory and executable on the processor. The computer program, when executed by the processor, implements steps of the foregoing image editing method.

According to a fourth aspect, the embodiments of the present disclosure further provide a computer-readable storage medium. The computer-readable storage medium stores a computer program. The computer program, when executed by a processor, implements the steps of the foregoing image editing method.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of the present disclosure shall fall within the protection scope of the present disclosure.

The embodiments of the present disclosure disclose an image editing method, applied to a terminal, where the terminal includes a first screen and a second screen.

Optionally, the terminal in the embodiments is a terminal with a foldable screen or a terminal with a double-sided screen. The first screen and the second screen may be screens on a same side of the terminal, for example, the first screen and the second screen are both screens on the front face of the terminal; or may be screens on different sides of the terminal. For example, the first screen is a screen on the front face of the terminal, and the second screen is a screen on the back of the terminal. This may be specifically set according to actual needs.

Figure 5:
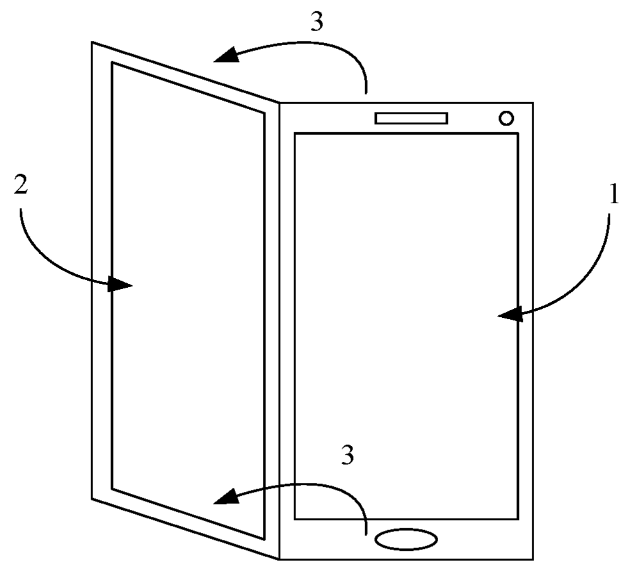
FIG. 5 is a schematic diagram of a terminal with a foldable screen according to an embodiment of this disclosure.

Preferably, when the terminal is a terminal with a foldable screen, the terminal specifically is a terminal with an opening and closing structure of a book page as shown in FIG. 5. The terminal may be folded or opened in a direction of an arrow indicated by the number 3. When the terminal is opened like a book, a first screen 1 and a second screen 2 are on the same side of the terminal, and the user can observe the first screen 1 and the second screen 2 of the terminal at the same time. When the terminal is closed like a book, the first screen 1 and the second screen 2 are on different sides of the terminal.

Figure 1:
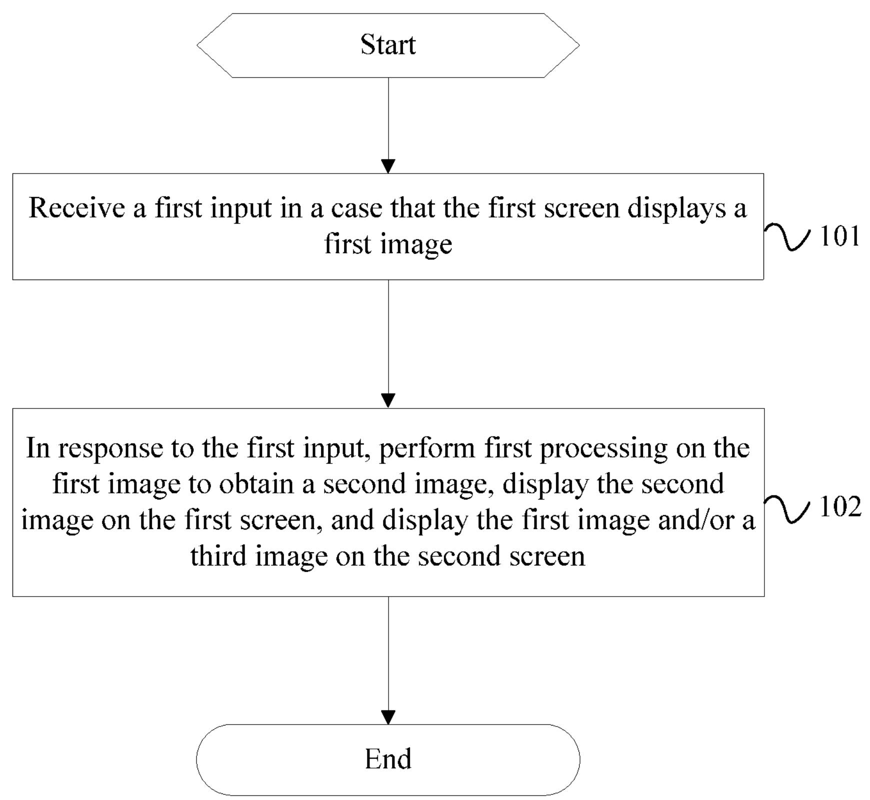
FIG. 1 is a flowchart of an image editing method according to an embodiment of the present disclosure.

Specifically, with reference to FIG. 1, the image editing method includes:

Step 101: Receive a first input in a case that the first screen displays a first image.

The first image is in an image editing state on the first screen. The first screen currently displays an image editing interface that includes the first image. In the image editing interface, the first image is in an image editing state.

Figure 6:
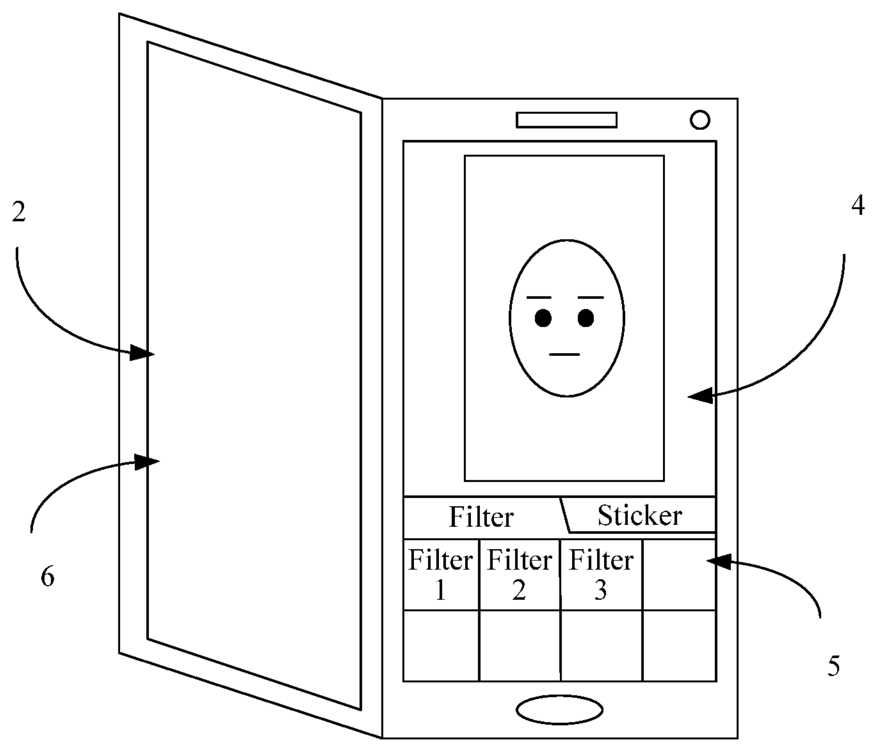
FIG. 6 is a schematic diagram in which an image preview interface is not started on a second screen according to an embodiment of the present disclosure.
Figure 7:
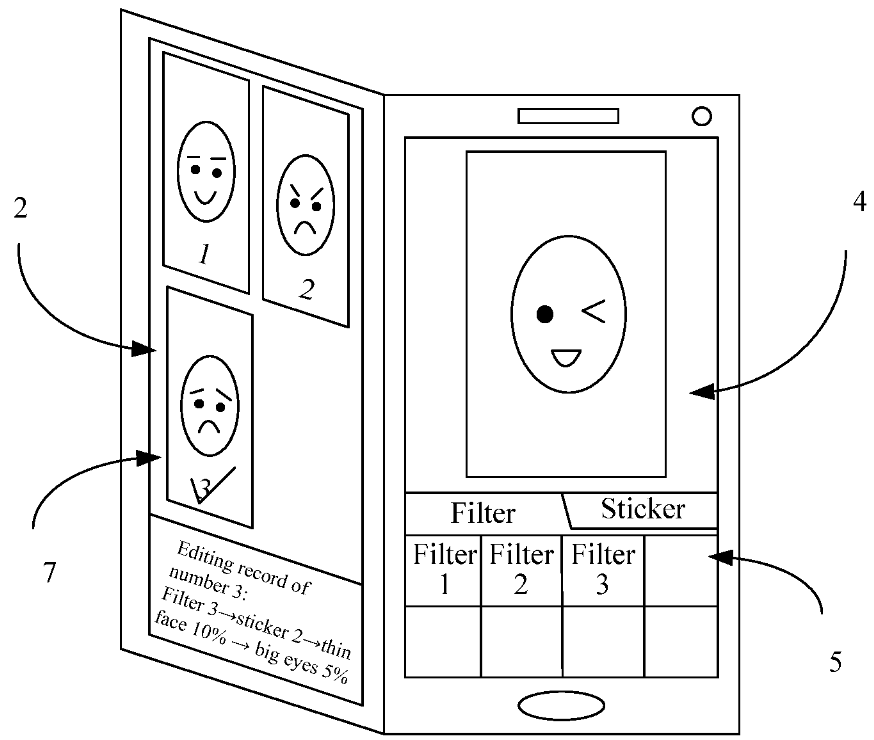
FIG. 7 is a schematic diagram in which an image preview interface is started on a second screen according to an embodiment of the present disclosure.

The image editing interface may be shown in FIG. 6 and FIG. 7. The image editing interface of the first screen may include: an image display area 4 and a display area 5 of an image editing option. The image editing option may specifically include filters with various effects, stickers with different effects, adjustment options for parameters such as light brightness and contrast, and the like. Editing operations are performed on an image in the image editing interface through various image editing options.

The first input may be an editing input performed on the first image, or a drag input performed on the first image, or a preset input that occurs on the first screen, or a preset input that occurs on the second screen, or a preset input that occurs on the first screen and the second screen at the same time. Alternatively, the first input is an operation input performed on a pop-up window during the image editing process. This is not specifically limited herein.

As a preferred implementation, the first input includes at least one of the following:

a sliding operation of dragging the first image to a side of the first screen; and a first sliding operation of dragging the first image to a side of the first screen and a second sliding operation performed in the second screen from a side of the second screen. Optionally, the side of the first screen is a side close to the second screen, and a sliding direction of the first sliding operation is the same as that of the second sliding operation;

a double-click operation performed on the first image;

a single-click operation performed on the first image; and a long-press operation performed on the first image. The long-press operation specifically is a press operation performed on the first image for more than a specified time.

Figure 8:
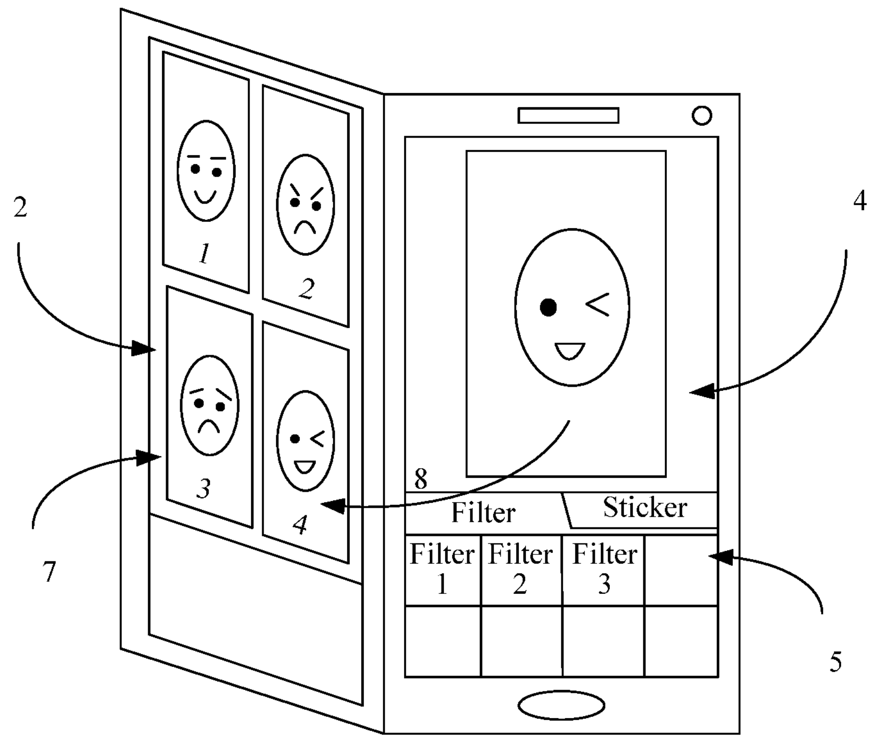
FIG. 8 is a schematic diagram of an operation of a first input according to an embodiment of this disclosure.

With reference to FIG. 8, when the first screen and the second screen are on a same side of the terminal, the first input includes: a sliding operation 8 of dragging the first image to a side of the first screen (a direction of an arrow), where the side of the first screen is a side close to the second screen. This facilitates a specific implementation of the first input and a user operation.

The foregoing different operations may be specifically set in a specific application process, to adapt to needs of different scenarios or different user editing inputs. This is not limited herein.

Step 102: In response to the first input, perform first processing on the first image to obtain a second image, display the second image on the first screen, and display the first image and/or a third image on the second screen.

The third image is an image obtained by performing second processing on the first image, and the second processing is a part of a processing process included in the first processing.

Multiple images may be displayed on the second screen at the same time. Preferably, the multiple images are displayed in a tile-based manner.

Further, before the second screen displays the first image and/or the third image, an image preview interface is started on the second screen.

Preferably, before the image preview interface is started on the second screen, the second screen is in an off state, and an image previewer of the second screen 2 is in an off state 6, as shown in FIG. 6. As shown in FIG. 7, when a system detects that the image editing interface is displayed on the first screen and the first image is displayed in the editing interface, it is determined that the first screen is in the image editing state. In this case, the second screen 2 is controlled to automatically start the previewer, and the image previewer is in an on state 7 to display an image preview interface.

Specifically, when a system detects that the image editing interface is displayed on the first screen and the first image is included in the image editing interface, it is determined that the first image is in the image editing state. In this case, an inquiry prompt box may pop up in the system to inquiry whether the image preview interface of the second screen needs to be started. If an operation of selecting a start option by the user is received, the second screen is controlled to automatically start the previewer to display an image preview interface. If an operation of selecting a non-start option by the user is received, the previewer of the second screen remains in the off state and does not display the image preview interface.

After the first input is received, editing processing is performed on the first image to obtain the processed second image.

The first input may be a single editing operation, or may include a group of editing operations.

When the first input includes a group of editing operations, the second image is an image obtained after the group of editing operations are performed on the first image, and the third image is an image obtained after some of the group of editing operations are performed on the first image. The second image corresponds to the first processing performed on the first image, and the first processing corresponds to a group of editing operations included in the first input. The third image corresponds to second processing performed on the first image, and the second processing corresponds to some of a group of editing operations included in the first input. There may be multiple third images. The number of third images is directly proportional to a specific number of the group of editing operations included in the first input.

For example, the first input includes: a filter adjustment operation, an intensity adjustment operation, and a contrast adjustment operation. The first image is an original image. The second image is an image obtained after all the three image adjustment operations included in the first input are performed on the first image. The third image may be an image obtained after the filter adjustment operation included in the first input is performed on the first image, or an image obtained after the intensity adjustment operation included in the first input is performed on the first image, an image obtained after the contrast adjustment operation included in the first input is performed on the first image, an image obtained after the filter adjustment operation and the intensity adjustment operation included in the first input are performed on the first image, an image obtained after the intensity adjustment operation and the contrast adjustment operation included in the first input are performed on the first image, or an image obtained after the filter adjustment operation and the contrast adjustment operation included in the first input are performed on the first image.

The second processing corresponds to at least one processing process formed after different processing operations in a part of a processing process included in the first processing are combined. In this way, the user may perform continuous processing operation inputs on the image on the first screen, to obtain multiple images with different effects generated in the processing process, display the effects on the second screen, and find an image with the optimal processing effect.

In the image editing method in this embodiment, a first input is received in a case that a first screen displays a first image, first processing is performed on the first image to obtain an second image, the second image is displayed on the first screen, and the first image and/or a third image that is obtained by performing a part of a processing process in image processing corresponding to the second image are/is displayed on the second screen. In this way, when the user performs a single processing operation input or continuous processing operation inputs on an image on the first screen, the second screen may display images with different processing effects. Therefore, the user can preview and compare different image editing effects and quickly identify an image with the best processing effect. Image preview on the second screen reduces operation processing steps of the user, facilitates an image editing and processing process of the user, and provides the user with better experience.

Further, as a preferred implementation, after the in response to the first input, performing first processing on the first image to obtain a second image, displaying the second image on the first screen, and displaying the first image and/or a third image on the second screen, the method further includes:

receiving a fifth input; and determining a third target image from the second screen in response to the fifth input and deleting the third target image.

Figure 10:
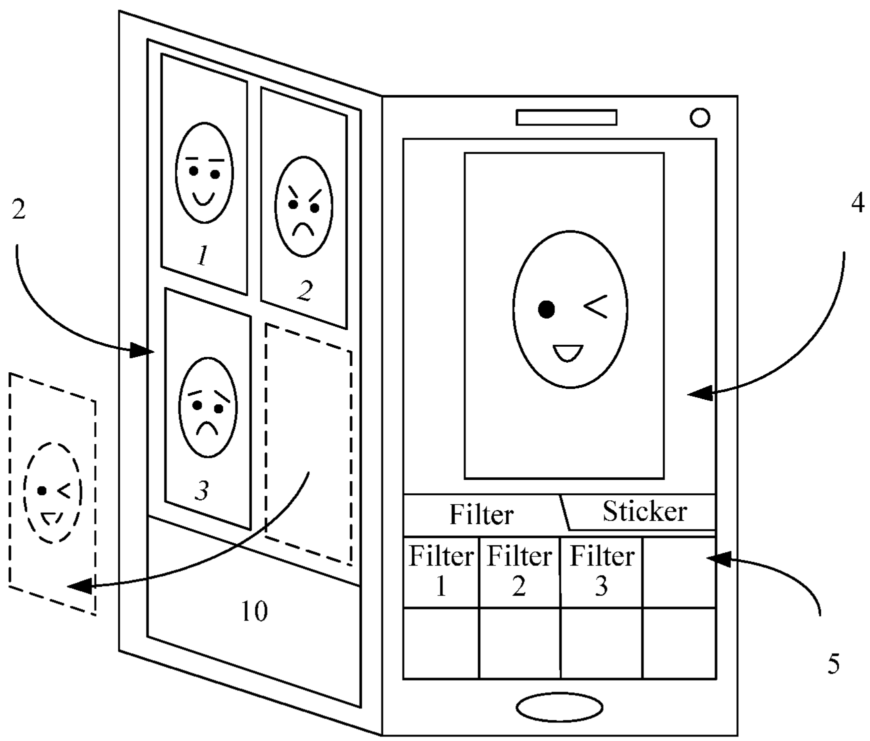
FIG. 10 is a schematic diagram of an operation of a third input according to an embodiment of this disclosure.

After the first image and/or the third image are/is displayed on the second screen, at least one image is displayed on the second screen. The fifth input is used to delete a target image of the at least one image displayed on the second screen. As shown in FIG. 10, the fifth input is preferably a drag operation 10 that starts from the third target image and ends at a display edge of the second screen 2. Preferably, during the drag operation of the fifth input, the third target image moves along with a sliding operation on the terminal until the third target image is deleted from the image preview interface of the second screen. In addition, relevant records of a processing step corresponding to the third target image are deleted while the third target image is deleted. This improves operation convenience and enhances user experience.

The embodiments of the present disclosure further disclose an image editing method, applied to a terminal, where the terminal includes a first screen and a second screen. A structure for disposing the first screen and the second screen is the same as that in the foregoing embodiments, and is not repeated herein again.

Figure 2:
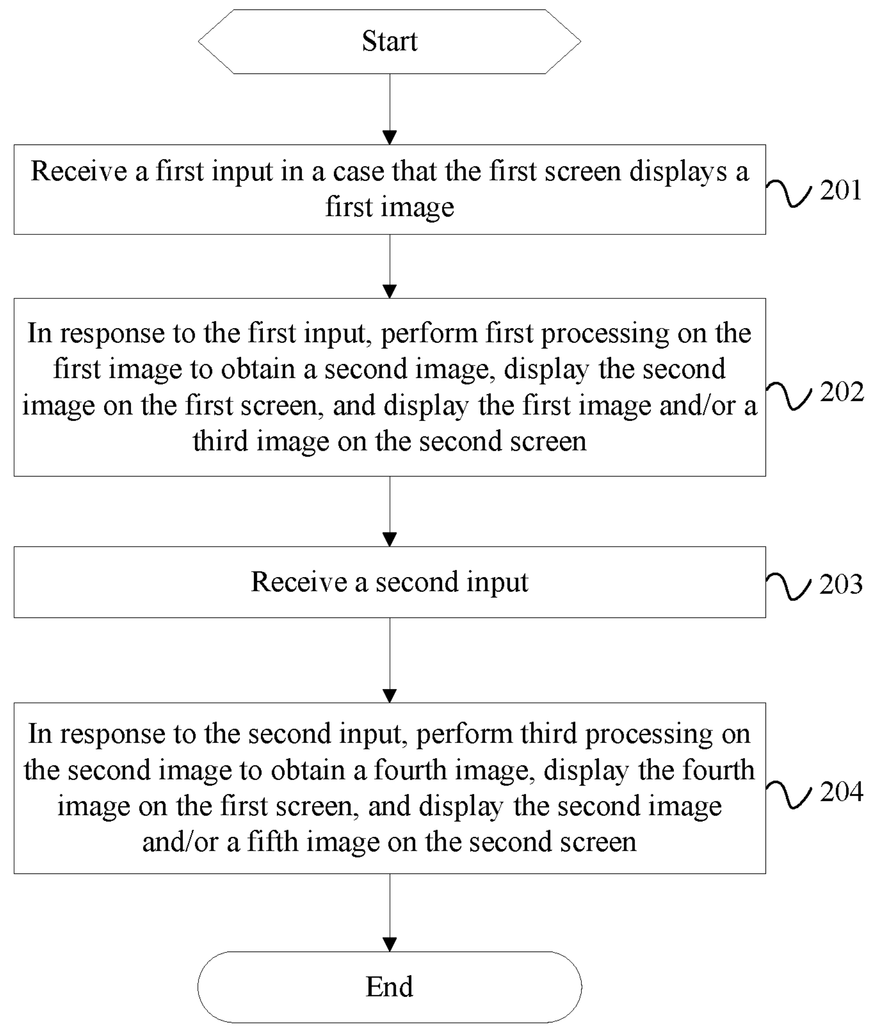
FIG. 2 is another flowchart of an image editing method according to an embodiment of the present disclosure.

As shown in FIG. 2, the image editing method includes:

Step 201: Receive a first input in a case that the first screen displays a first image.

The implementation of this process is the same as that in the foregoing embodiments, and is not repeated herein again.

Step 202: In response to the first input, perform first processing on the first image to obtain a second image, display the second image on the first screen, and display the first image and/or a third image on the second screen.

The third image is an image obtained by performing second processing on the first image, and the second processing is a part of a processing process included in the first processing.

The implementation of this process is the same as that in the foregoing embodiments, and is not repeated herein again.

Further, after the displaying the second image on the first screen, and displaying the first image and/or a third image on the second screen, the method further includes:

Step 203: Receive a second input.

The second input may be an editing input performed on the second image, or a drag input performed on the second image, or a preset input that occurs on the first screen, or a preset input that occurs on the second screen, or a preset input that occurs on the first screen and the second screen at the same time. Alternatively, the second input is an operation input performed on a pop-up window during the image editing process. This is not specifically limited herein.

As a preferred implementation, the second input includes at least one of the following:

a sliding operation of dragging the second image to a side of the first screen; and a first sliding operation of dragging the second image to a side of the first screen and a second sliding operation performed in the second screen from a side of the second screen. Optionally, the side of the first screen is a side close to the second screen, and a sliding direction of the first sliding operation is the same as that of the second sliding operation;

a double-click operation performed on the second image;

a single-click operation performed on the second image; and a long-press operation performed on the second image. The long-press operation specifically is a press operation performed on the second image for more than a specified time.

The foregoing different operations may be specifically set in a specific application process, to adapt to needs of different scenarios or different user editing inputs. This is not limited herein.

Step 204: In response to the second input, perform third processing on the second image to obtain a fourth image, display the fourth image on the first screen, and display the second image and/or a fifth image on the second screen.

The fifth image is an image obtained by performing fourth processing on the first image, and the fourth processing is a part of a processing process included in the first processing and/or the third processing.

Preferably, while the second screen displays the second image and/or the fifth image, the second screen may display the first image and/or the third image in the foregoing process.

In this step, an image processing operation is further performed on the obtained second image to obtain the fourth image, and the second image displayed on the first screen is updated to the latest obtained fourth image. The second image on which processing is not performed is displayed on the second screen, or the fifth image may be displayed on the second screen, or the second image and the fifth image are displayed on the second screen at the same time.

The fifth image is generated based on the first image, and it may be considered in essence that the second image, the third image, and the fourth image are generated based on the first image.

The fourth processing corresponds to at least one processing process formed after different processing operations in a part of a processing included in the first processing are combined, or corresponds to at least one processing process formed after different processing operations in a part of a processing included in the third processing are combined, or corresponds to at least one processing process formed after different processing operations in a part of a processing included in the first processing and different processing operations in a part of a processing included in the second processing are combined. In this way, the user may perform continuous processing operation inputs on the image on the first screen, to obtain multiple images with different effects generated in the processing process, display the effects on the second screen, and find an image with the optimal processing effect.

The fifth image is an image obtained after a part of a processing process included in first processing is performed on the first image, or is an image obtained after a part of a processing process included in third processing is performed on the first image, or is an image obtained after a part of a processing process included in first processing and third processing is performed on the first image.

The second input may be a single editing operation, or may include a group of editing operations.

An example is used for description. The first input includes: a filter adjustment operation and an intensity adjustment operation. The second input is a group of editing operations, for example, a contrast adjustment operation or a sticker adding operation. In this case, the fifth image may be an image obtained after the filter adjustment operation included in the first input is performed on the first image, an image obtained after the intensity adjustment operation included in the first input is performed on the first image, an image obtained after the contrast adjustment operation included in the second input is performed on the first image, an image obtained after the sticker adding operation included in the second input is performed on the first image, an image obtained after the filter adjustment operation and the contrast adjustment operation are performed on the first image, an image obtained after the filter adjustment operation and the sticker adjustment operation are performed on the first image, an image obtained after the intensity adjustment operation and the contrast adjustment operation are performed on the first image, or an image obtained after the contrast adjustment operation and the sticker adding operation are performed on the first image.

The number of fifth images is directly proportional to both a specific number of the group of editing operations included in the first input and a specific number of the group of editing operations included in the second input.

In this way, the user may perform continuous processing operation inputs on the image on the first screen, to obtain multiple images with different effects generated in the processing process, display the effects on the second screen, and find an image with the optimal processing effect.

In the image editing method in this embodiment, a first input is received in a case that a first screen displays a first image, first processing is performed on the first image to obtain an second image, the second image is displayed on the first screen, and the first image and/or a third image that is obtained by performing a part of a processing process in image processing corresponding to the second image are/is displayed on the second screen. Additional editing processing is performed on the second image through a subsequent user input, and the second image and/or the fifth image that is obtained by performing a part of a processing process in image processing corresponding to the second image are/is displayed on the second screen. In this way, when the user performs a single processing operation input or continuous processing operation inputs on an image on the first screen, the second screen may display images with different processing effects. Therefore, the user can preview and compare different image editing effects and quickly identify an image with the best processing effect. Image preview on the second screen reduces operation processing steps of the user, facilitates an image editing and processing process of the user, and provides the user with better experience.

The embodiments of the present disclosure further disclose an image editing method, applied to a terminal, where the terminal includes a first screen and a second screen. A structure for disposing the first screen and the second screen is the same as that in the foregoing embodiments, and is not repeated herein again.

Figure 3:
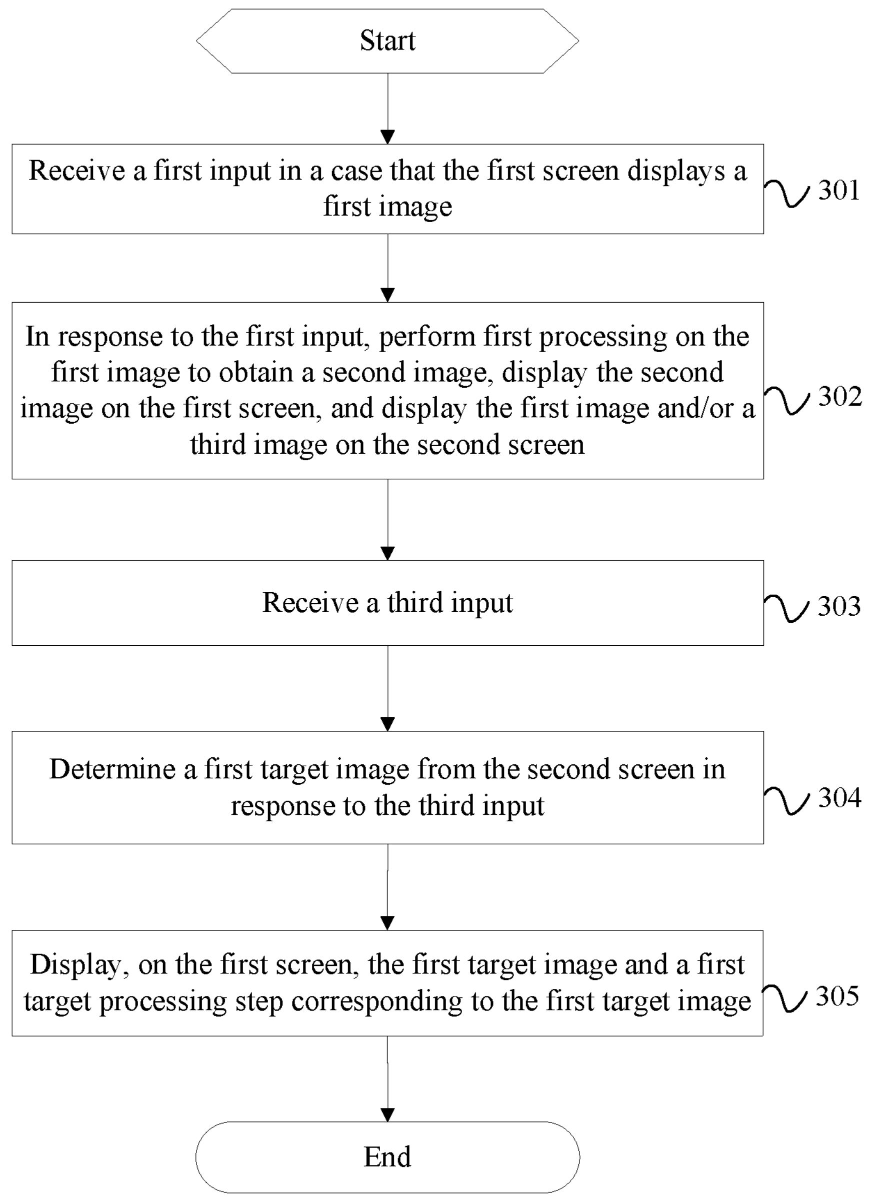
FIG. 3 is still another flowchart of an image editing method according to an embodiment of the present disclosure.

As shown in FIG. 3, the image editing method includes:

Step 301: Receive a first input in a case that the first screen displays a first image.

The implementation of this process is the same as that in the foregoing embodiments, and is not repeated herein again.

Step 302: In response to the first input, perform first processing on the first image to obtain a second image, display the second image on the first screen, and display the first image and/or a third image on the second screen.

The third image is an image obtained by performing second processing on the first image, and the second processing is a part of a processing process included in the first processing.

The implementation of this process is the same as that in the foregoing embodiments, and is not repeated herein again.

Further, after the in response to the first input, performing first processing on the first image to obtain a second image, displaying the second image on the first screen, and displaying the first image and/or a third image on the second screen, the method further includes:

Step 303: Receive a third input.

Figure 9:
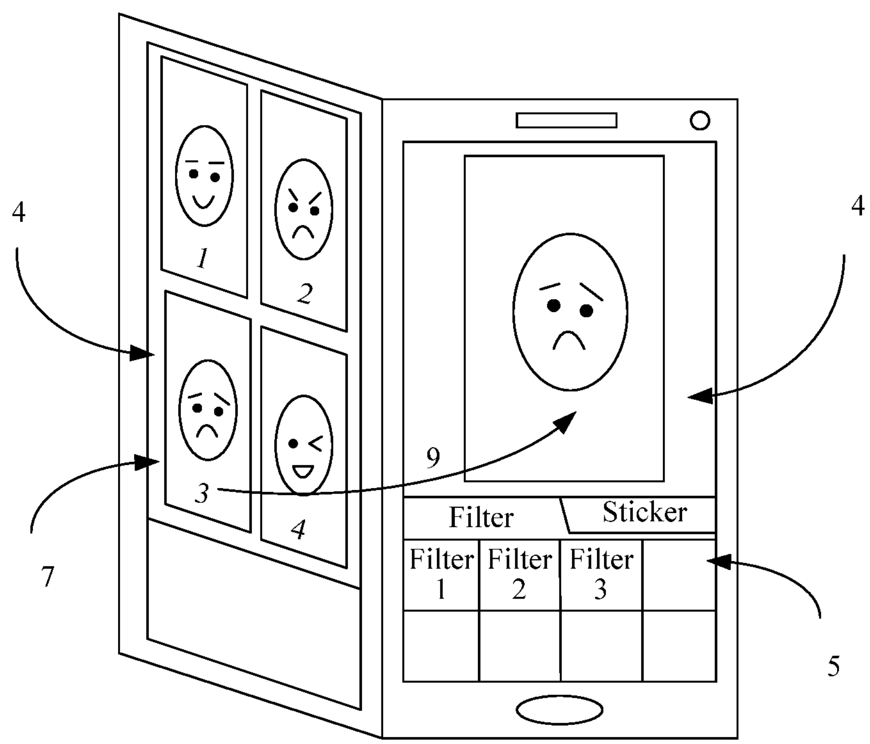
FIG. 9 is a schematic diagram of an operation of a fifth input according to an embodiment of this disclosure.

The third input may include at least one of the following:

a sliding operation of dragging a target image on the second screen to a side of the second screen; and a first sliding operation of dragging a target image on the second screen to a side of the second screen and a second sliding operation performed in the first screen from a side of the first screen, where as shown in FIG. 9, the third input is an operation in a direction of an arrow identified by the numeral 9.

The third input further includes: a double-click operation performed on a target image on the second screen;

a single-click operation performed on a target image on the second screen; and a long-press operation performed on a target image on the second screen.

When the third input includes a first sliding operation of dragging a target image on the second screen to a side of the second screen and a second sliding operation performed in the first screen from a side of the first screen, a sliding direction of the first sliding operation is the same as that of the second sliding operation.

The target image on the second screen is selected through an operation input of the user, and restored in the current image editing interface of the first screen, so that the user may continue to perform an editing operation the selected image.

Step 304: Determine a first target image from the second screen in response to the third input.

At least one image is displayed on the second screen. The target image is selected from the at least one image through the third input of the user. Specifically, different display images on the second screen correspond to respective image processing steps for forming the images. Image processing steps corresponding to different images displayed on the second screen need to be recorded to form image editing operation records.

Step 305: Display, on the first screen, the first target image and a first target processing step corresponding to the first target image.

Preferably, the displaying the first target image on the first screen specifically includes: restoring the first target image to the editing state corresponding to the first target processing step.

The first target processing step is also displayed on the first screen to assist users to further adjust and modify the display effect of the first target image.

Besides, when the first target image is displayed on the first screen, the current display image on the first screen is preferably replaced with the first target image for display to perform further editing.

While replacing the current display image in the first screen with the first target image, according to the first target processing step, the editing state of the first target image is restored. In this way, the user may withdraw an editing operation performed on the first target image, or continue to perform more editing operations such as effect overlay, to meet diverse image editing needs of the user.

In this implementation process, the second screen displays generated images with different processing effects. Therefore, the user can preview and compare different image editing effects and quickly identify an image with the best processing effect. Image preview on the second screen reduces operation processing steps of the user, facilitates an image editing and processing process of the user, and provides the user with better experience. In addition, the editing state of the preview image on the second screen is restored according to the recorded editing operation steps. This facilitates an image editing and processing process of the user and provides the user with better experience.

The embodiments of the present disclosure further disclose an image editing method, applied to a terminal, where the terminal includes a first screen and a second screen. A structure for disposing the first screen and the second screen is the same as that in the foregoing embodiments, and is not repeated herein again.

Figure 4:
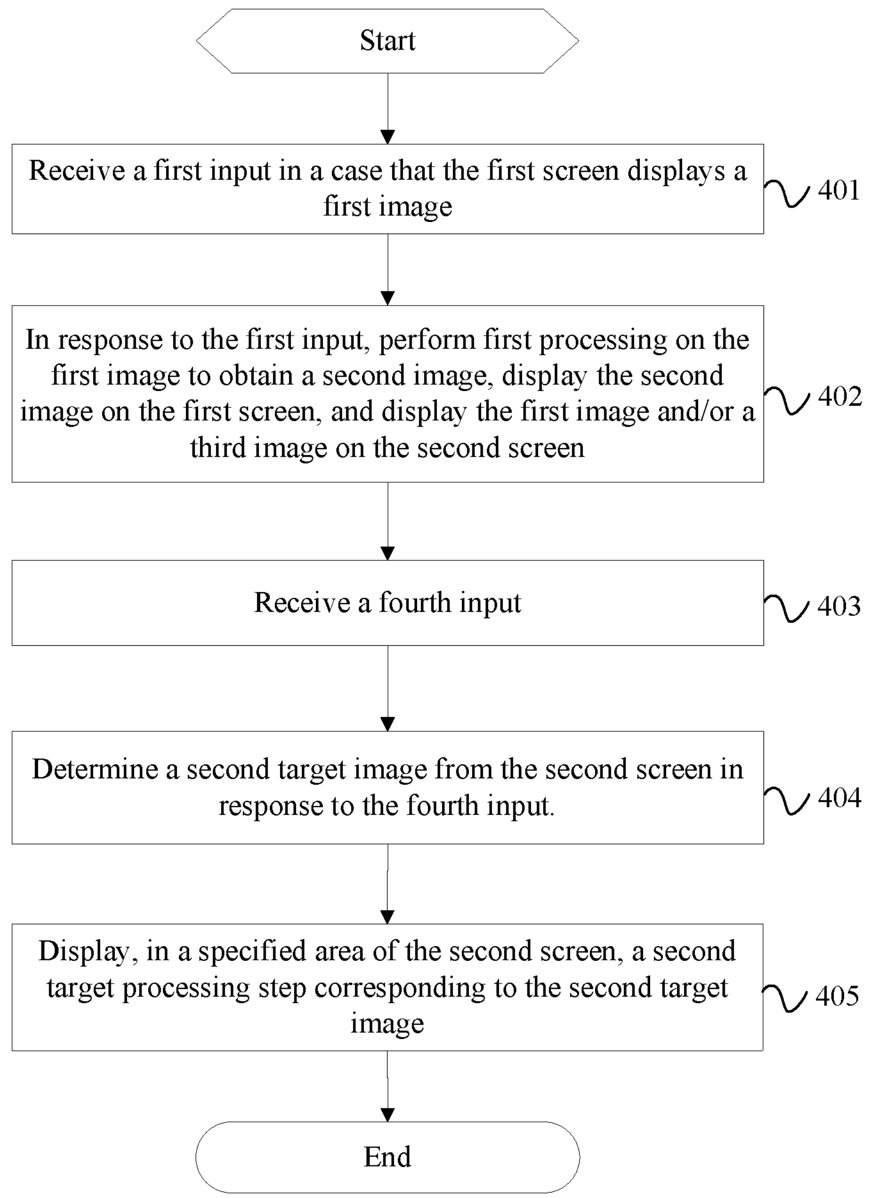
FIG. 4 is yet another flowchart of an image editing method according to an embodiment of the present disclosure.

As shown in FIG. 4, the image editing method includes:

Step 401: Receive a first input in a case that the first screen displays a first image.

The implementation of this process is the same as that in the foregoing embodiments, and is not repeated herein again.

Step 402: In response to the first input, perform first processing on the first image to obtain a second image, display the second image on the first screen, and display the first image and/or a third image on the second screen.

where the third image is an image obtained by performing second processing on the first image, and the second processing is a part of a processing process included in the first processing.

The implementation of this process is the same as that in the foregoing embodiments, and is not repeated herein again.

Further, after the in response to the first input, performing first processing on the first image to obtain a second image, displaying the second image on the first screen, and displaying the first image and/or a third image on the second screen, the method further includes:

Step 403: Receive a fourth input.

The fourth input may be a click selection operation performed on the display image on the second screen, or a touch input operation performed on an image selection button.

Step 404: Determine a second target image from the second screen in response to the fourth input.

At least one image is displayed on the second screen. The target image is selected from the at least one image through the fourth input of the user. Specifically, different display images on the second screen correspond to respective image processing steps for forming the images. Image processing steps corresponding to different images displayed on the second screen need to be recorded to form image editing operation records.

Step 405: Display, in a specified area of the second screen, a second target processing step corresponding to the second target image.

The display interface of the second screen is divided into different display areas. The second target image is displayed in the first area, and the second target processing step corresponding to the second target image is displayed in the second area.

The display of the image processing step corresponding to the image can enable the user to know an editing operation step corresponding to the best editing effect when image editing effects are compared, so that the user can apply the editing operation step to an editing process of another image. This facilitates an image editing and processing process of the user and provides the user with better experience. In this implementation process, the second screen displays generated images with different processing effects. Therefore, the user can preview and compare different image editing effects and quickly identify an image with the best processing effect. Image preview on the second screen reduces operation processing steps of the user, facilitates an image editing and processing process of the user, and provides the user with better experience. In addition, historical editing operations of preview images are recorded and displayed on the second screen. This facilitates an image editing and processing process of the user and provides the user with better experience.

Figure 11:
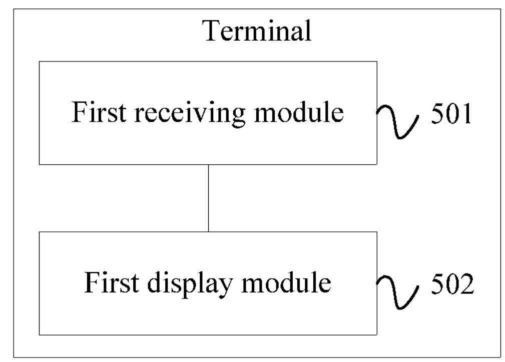
FIG. 11 is a structural block diagram 1 of a terminal according to an embodiment of this disclosure.
Figure 12:
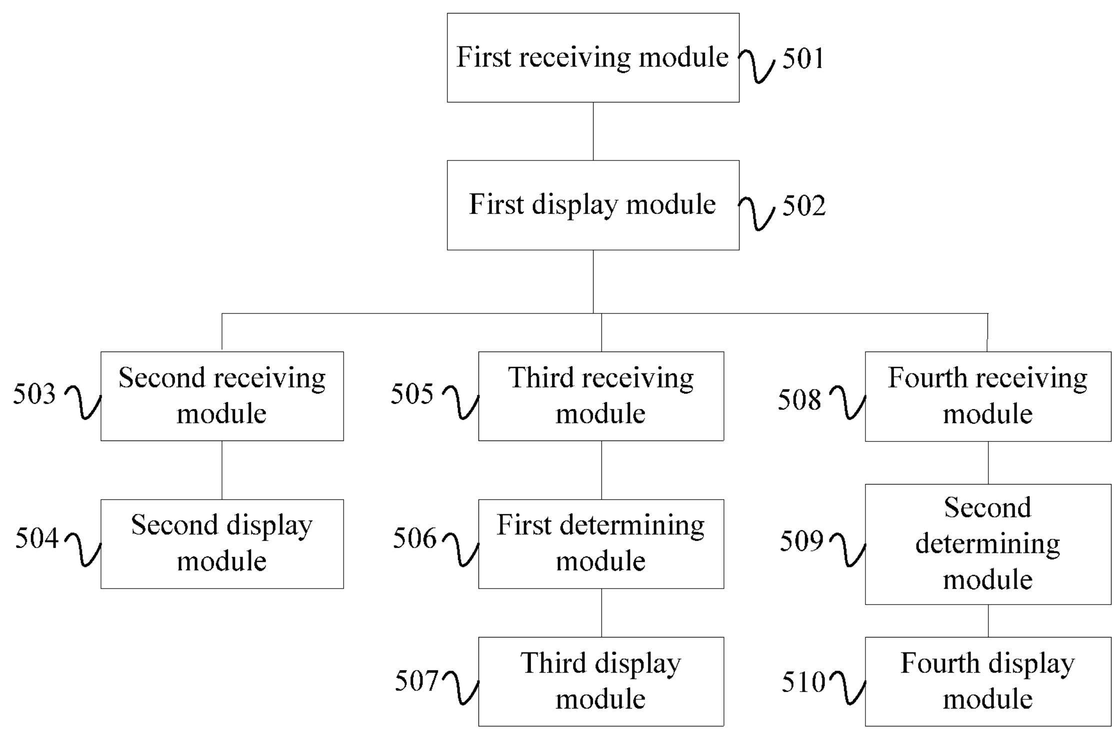
FIG. 12 is a structural block diagram 2 of a terminal according to an embodiment of this disclosure.

The embodiments of the present disclosure further disclose a terminal. As shown in FIG. 11 and FIG. 12, the terminal has a first screen and a second screen, and the terminal further includes: a first receiving module 501 and a first display module 502.

The first receiving module 501 is configured to receive a first input in a case that the first screen displays a first image.

The first display module 502 is configured to: in response to the first input, perform first processing on the first image to obtain a second image, display the second image on the first screen, and display the first image and/or a third image on the second screen; where the third image is an image obtained by performing second processing on the first image, and the second processing is a part of a processing process included in the first processing.

Further, optionally, the terminal further includes:

a second receiving module 503, configured to receive a second input; and a second display module 504, configured to: in response to the second input, perform third processing on the second image to obtain a fourth image, display the fourth image on the first screen, and display the second image and/or a fifth image on the second screen;

where the fifth image is an image obtained by performing fourth processing on the first image, and the fourth processing is a part of a processing process included in the first processing and/or the third processing.

Optionally, the first input includes at least one of the following:

a sliding operation of dragging the first image to a side of the first screen;

a first sliding operation of dragging the first image to a side of the first screen and a second sliding operation performed in the second screen from a side of the second screen;

a double-click operation performed on the first image;

a single-click operation performed on the first image; and a long-press operation performed on the first image.

Further, optionally, the terminal further includes:

a third receiving module 505, configured to receive a third input;

a first determining module 506, configured to determine a first target image from the second screen in response to the third input; and a third display module 507, configured to display, on the first screen, the first target image and a first target processing step corresponding to the first target image.

Further, optionally, the terminal further includes:

a fourth receiving module 508, configured to receive a fourth input;

a second determining module 509, configured to determine a second target image from the second screen in response to the fourth input; and a fourth display module 510, configured to display, in a specified area of the second screen, a second target processing step corresponding to the second target image.

The terminal receives a first input in a case that a first screen displays a first image, performs first processing on the first image to obtain an second image, displays the second image on the first screen, and displays the first image and/or a third image that is obtained by performing a part of a processing process in image processing corresponding to the second image on the second screen. In this way, when the user performs a single processing operation input or continuous processing operation inputs on an image on the first screen, the second screen may display images with different processing effects. Therefore, the user can preview and compare different image editing effects and quickly identify an image with the best processing effect. Image preview on the second screen reduces operation processing steps of the user, facilitates an image editing and processing process of the user, and provides the user with better experience.

The mobile terminal provided in the embodiments of the present disclosure can implement each process in embodiments of the image editing method, and achieve same beneficial effects. To avoid repetition, details are not described herein again.

Figure 13:
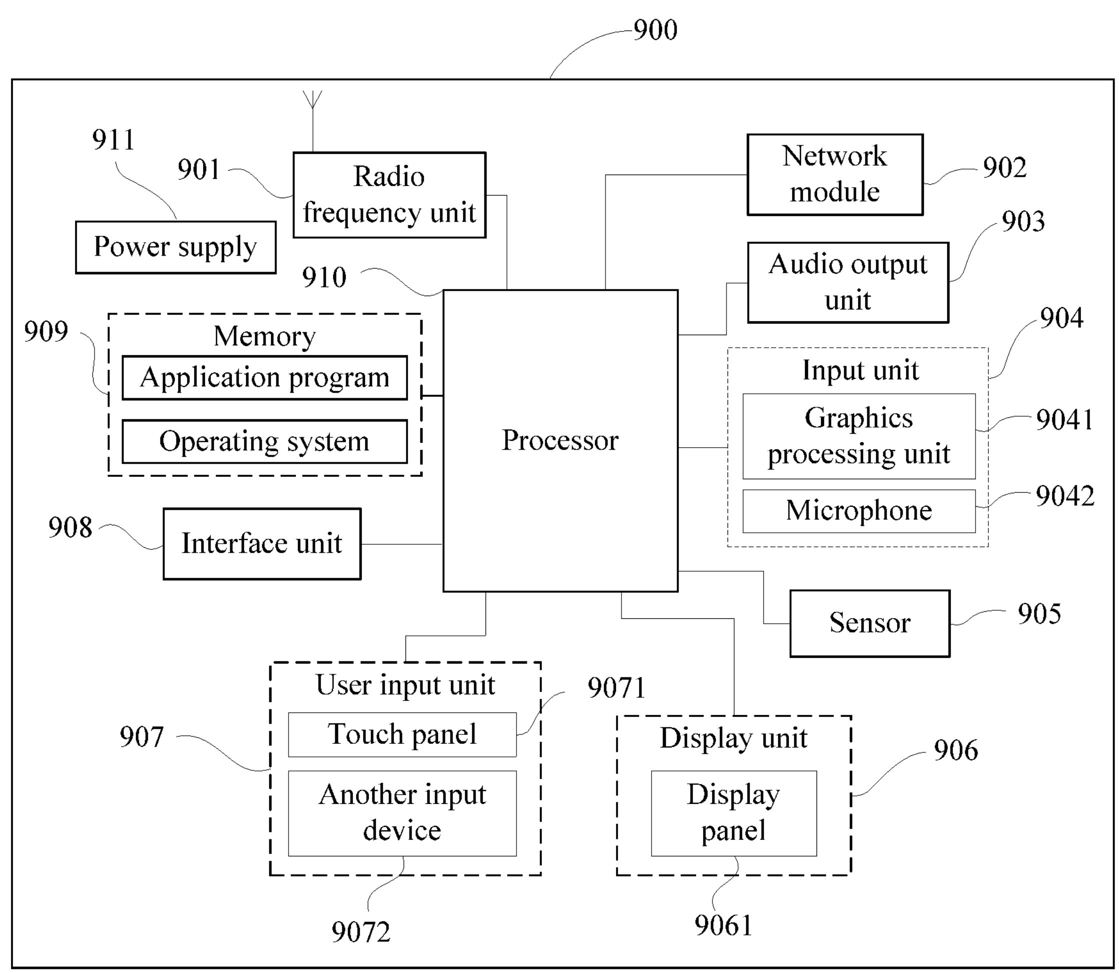
FIG. 13 is a schematic diagram of a hardware structure of a mobile terminal implementing various embodiments of this disclosure.

FIG. 13 is a schematic diagram of a hardware structure of a mobile terminal according to an embodiment of this disclosure.

The mobile terminal 900 includes, but is not limited to: a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that the structure of the mobile terminal shown in FIG. 13 constitutes no limitation on the mobile terminal, and the mobile terminal may include more or fewer parts than those shown in the figure, or combine some parts, or have a different part arrangement. In this embodiment of the present disclosure, the mobile terminal includes, but is not limited to, a mobile phone, a tablet computer, a laptop computer, a palmtop computer, an in-vehicle terminal, a wearable device, a pedometer, and the like.

The mobile terminal 900 includes a first screen and a second screen. The user input unit 907 is configured to: receive a first input in a case that the first screen displays a first image; and the processor 910 is configured to: in response to the first input, perform first processing on the first image to obtain a second image, display the second image on the first screen, and display the first image and/or a third image on the second screen; where the third image is an image obtained by performing second processing on the first image, and the second processing is a part of a processing process included in the first processing.

The mobile terminal receives a first input in a case that a first screen displays a first image, performs first processing on the first image to obtain an second image, displays the second image on the first screen, and displays the first image and/or a third image that is obtained by performing a part of a processing process in image processing corresponding to the second image on the second screen. In this way, when the user performs a single processing operation input or continuous processing operation inputs on an image on the first screen, the second screen may display images with different processing effects. Therefore, the user can preview and compare different image editing effects and quickly identify an image with the best processing effect. Image preview on the second screen reduces operation processing steps of the user, facilitates an image editing and processing process of the user, and provides the user with better experience.

It should be understood that, in embodiments of the present disclosure, the radio frequency unit 901 may be configured to receive and send information or receive and send a signal in a call process. Specifically, after receiving downlink data from a base station, the radio frequency unit 901 sends the downlink data to the processor 910 for processing. In addition, the radio frequency unit 901 sends uplink data to the base station. Generally, the radio frequency unit 901 includes, but is not limited to, an antenna, at least one amplifier, a transceiver, a coupler, a low noise amplifier, a duplexer, and the like. In addition, the radio frequency unit 901 may further communicate with another device by using a wireless communications system and network.

The mobile terminal provides wireless broadband Internet access for a user by using the network module 902, for example, helping the user send and receive an email, browsing a web page, and accessing streaming media.

The audio output unit 903 may convert audio data received by the radio frequency unit 901 or the network module 902 or stored in the memory 909 into an audio signal and output the audio signal as a sound. Moreover, the audio output unit 903 may further provide audio output (for example, call signal receiving sound and message receiving sound) related to a specific function executed by the mobile terminal 900. The audio output unit 903 includes a speaker, a buzzer, a telephone receiver, and the like.

The input unit 904 is configured to receive audio or video signals. The input unit 904 may include a graphics processing unit (GPU) 9041 and a microphone 9042. The graphics processing unit 9041 processes image data of a static picture or a video obtained by an image capture apparatus (for example, a camera) in a video capture mode or image capture mode. A processed image frame can be displayed on the display unit 906. The image frame processed by the graphics processing unit 9041 may be stored in the memory 909 (or other storage mediums) or sent by using the radio frequency unit 901 or the network module 902. The microphone 9042 can receive sound, and can process such sound into audio data. The audio data obtained through processing may be converted, in a telephone call mode, into a format that can be sent to a mobile communications base station via the radio frequency unit 901 for output.

The mobile terminal 900 further includes at least one sensor 905, such as an optical sensor, a motion sensor, and another sensor. Specifically, the optical sensor includes an ambient optical sensor and a proximity sensor. The ambient optical sensor may adjust luminance of the display panel 9061 based on brightness of ambient light, and the proximity sensor may disable the display panel 9061 and/or backlight when the mobile terminal 900 approaches an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 905 may further include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information entered by a user or information provided for a user. The display unit 906 may include a display panel 9061, and the display panel 9061 may be configured in a form of a liquid crystal display (LCD), an organic light-emitting diode (OLED), or the like.

The user input unit 907 may be configured to receive inputted digit or character information and generate key signal input related to user setting and function control of the terminal. Specifically, the user input unit 907 includes a touch panel 9071 and another input device 9072. The touch panel 9071, also referred to as a touch screen, may collect a touch operation of a user on or near the touch panel 9071 (for example, the user uses any suitable object or accessory such as a finger or a stylus to operate on or near the touch panel 9071). The touch panel 9071 may include two parts: a touch detection apparatus and a touch controller. The touch detection apparatus detects a touch location of the user, detects a signal carried by a touch operation, and transmits the signal to the touch controller.

The touch controller receives touch information from the touch detection apparatus, converts the touch information into touch point coordinates, sends the touch point coordinates to the processor 910, and receives and executes a command from the processor 910. In addition, the touch panel 9071 may be implemented in various types such as resistive, capacitive, infrared, and surface acoustic wave. The user input unit 907 may further include another input device 9072 in addition to the touch panel 9071. Specifically, the another input device 9072 may include, but is not limited to, a physical keyboard, function keys (such as a volume control key and a switch key), a trackball, a mouse, and a joystick. Details are not described herein.

Further, the touch panel 9071 can cover the display panel 9061. When detecting a touch operation on or near the touch panel 9071, the touch panel 9071 transmits the touch operation to the processor 910 to determine a type of a touch event. Then, the processor 910 provides corresponding visual output on the display panel 9061 based on the type of the touch event. In FIG. 13, although the touch panel 9071 and the display panel 9061 are used as two independent parts to implement input and output functions of the mobile terminal, in some embodiments, the touch panel 9071 and the display panel 9061 may be integrated to implement the input and output functions of the mobile terminal. Details are not described herein.

The interface unit 908 is an interface for connecting an external apparatus with the mobile terminal 900. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 908 may be configured to receive an input (for example, data information and power) from the external apparatus and transmit the received input to one or more elements in the mobile terminal 900, or transmit data between the mobile terminal 900 and the external apparatus.

The memory 909 may be configured to store software programs and various data. The memory 909 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 909 may include a high-speed random access memory, and may further include a non-volatile memory, for example, at least one magnetic disk storage device, a flash memory device, or another volatile solid-state storage device.

The processor 910 is a control center of the mobile terminal, and is connected to all parts of the entire mobile terminal by using various interfaces and lines, and performs various functions of the mobile terminal and processes data by running or executing the software program and/or the module that are/is stored in the memory 909 and invoking the data stored in the memory 909, to implement overall monitoring on the mobile terminal. The processor 910 may include one or more processing units. Optionally, the processor 910 may integrate an application processor and a modem processor. The application processor mainly deals with an operating system, a user interface, an application, and the like. The modem processor mainly deals with wireless communication. It may be understood that alternatively, the modem processor may not be integrated into the processor 910.

The terminal 900 may also include the power supply 911 (for example, a battery) that supplies power to various components. Optionally, the power supply 911 may be logically connected to the processor 910 by using a power supply management system, to implement functions of managing charging, discharging, and power consumption by using the power supply management system.

In addition, the mobile terminal 900 includes some function modules not shown, and details are not described herein.

Optionally, the embodiments of the present disclosure further provide a mobile terminal, including a processor 910, a memory 909, and a computer program stored in the memory 909 and executable on the processor 910. The computer program, when executed by the processor 910, implements each process of embodiments of the foregoing image editing method, and same technical effect can be achieved. To avoid repetition, details are not described herein again.

The embodiments of the present disclosure further provide a computer-readable storage medium. The computer-readable storage medium stores a computer program. The computer program, when executed by a processor, implements each process of the embodiment of the foregoing image editing method, and a same technical effect can be achieved. To avoid repetition, details are not described herein again. The computer-readable storage medium is, for example, a read-only memory (ROM for short), a random access memory (RAM for short), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

The above embodiments are preferred embodiments of the present disclosure. It should be noted that, within the technical concept of the present disclosure, those ordinarily skilled in the art can make various improvements and modifications, which shall all fall within the protective scope of the present disclosure.

The invention claimed is:

1. An image editing method, applied to a terminal with a foldable screen or a terminal with a double-sided screen, wherein the terminal comprises a first screen and a second screen, and the image editing method comprises:

receiving a first input in a case that the first screen displays a first image, wherein the first input comprises a group of editing operations; and in response to the first input, performing first processing on the first image to obtain a second image, displaying the second image on the first screen, and displaying the first image and a third image on the second screen or displaying a third image on the second screen;

wherein the third image is an image obtained by performing second processing on the first image, and the second processing corresponds to a part of editing operations among the group of editing operations comprised in the first processing.

2. The image editing method according to claim 1, after the displaying the second image on the first screen, and displaying the first image and a third image on the second screen or displaying a third image on the second screen, further comprising:

receiving a second input; and in response to the second input, performing third processing on the second image to obtain a fourth image, displaying the fourth image on the first screen, and displaying at least one of the second image and a fifth image on the second screen;

wherein the fifth image is an image obtained by performing fourth processing on the first image, and the fourth processing is a part of a processing process comprised in at least one of the first processing and the third processing.

3. The image editing method according to claim 1, wherein the first input comprises at least one of the following:

a sliding operation of dragging the first image to a side of the first screen;

a first sliding operation of dragging the first image to a side of the first screen and a second sliding operation performed in the second screen from a side of the second screen;

a double-click operation performed on the first image;

a single-click operation performed on the first image; and a long-press operation performed on the first image.

4. The image editing method according to claim 1, wherein after the in response to the first input, performing first processing on the first image to obtain a second image, displaying the second image on the first screen, and displaying the first image and a third image on the second screen or displaying a third image on the second screen, the method further comprises:

receiving a third input;

determining a first target image from the second screen in response to the third input; and displaying, on the first screen, the first target image and a first target processing step corresponding to the first target image.

5. The image editing method according to claim 1, wherein after the in response to the first input, performing first processing on the first image to obtain a second image, displaying the second image on the first screen, and displaying the first image and a third image on the second screen or displaying a third image on the second screen, the method further comprises:

receiving a fourth input;

determining a second target image from the second screen in response to the fourth input; and displaying, in a specified area of the second screen, a second target processing step corresponding to the second target image.

6. A terminal, wherein the terminal is with a foldable screen or with a double-sided screen, and the terminal comprises a first screen and a second screen, further comprises a processor, a memory, and a computer program stored in the memory and executable on the processor, wherein the computer program, when executed by the processor, implements:

receiving a first input in a case that the first screen displays a first image, wherein the first input comprises a group of editing operations; and in response to the first input, performing first processing on the first image to obtain a second image, displaying the second image on the first screen, and displaying the first image and a third image on the second screen or displaying a third image on the second screen;

wherein the third image is an image obtained by performing second processing on the first image, and the second processing corresponds to a part of editing operations among the group of editing operations comprised in the first processing.

7. The terminal according to claim 6, wherein after the displaying the second image on the first screen, and displaying the first image and a third image on the second screen or displaying a third image on the second screen, the computer program, when executed by the processor, further implements:

receiving a second input; and in response to the second input, performing third processing on the second image to obtain a fourth image, displaying the fourth image on the first screen, and displaying at least one of the second image and a fifth image on the second screen;

wherein the fifth image is an image obtained by performing fourth processing on the first image, and the fourth processing is a part of a processing process comprised in at least one of the first processing and the third processing.

8. The terminal according to claim 6, wherein the first input comprises at least one of the following:

a sliding operation of dragging the first image to a side of the first screen;

a first sliding operation of dragging the first image to a side of the first screen and a second sliding operation performed in the second screen from a side of the second screen;

a double-click operation performed on the first image;

a single-click operation performed on the first image; and a long-press operation performed on the first image.

9. The terminal according to claim 6, wherein after the in response to the first input, performing first processing on the first image to obtain a second image, displaying the second image on the first screen, and displaying the first image and a third image on the second screen or displaying a third image on the second screen, the computer program, when executed by the processor, further implements:

receiving a third input;

determining a first target image from the second screen in response to the third input; and displaying, on the first screen, the first target image and a first target processing step corresponding to the first target image.

10. The terminal according to claim 6, wherein after the in response to the first input, performing first processing on the first image to obtain a second image, displaying the second image on the first screen, and displaying the first image and a third image on the second screen or displaying a third image on the second screen, the computer program, when executed by the processor, further implements:

receiving a fourth input;

determining a second target image from the second screen in response to the fourth input; and displaying, in a specified area of the second screen, a second target processing step corresponding to the second target image.

11. A non-transitory computer-readable storage medium, wherein the non-transitory computer-readable storage medium stores a computer program, and the computer program, when executed by a processor, implements:

receiving a first input in a case that a first screen displays a first image, wherein the first input comprises a group of editing operations; and in response to the first input, performing first processing on the first image to obtain a second image, displaying the second image on the first screen, and displaying the first image and a third image on a second screen or displaying a third image on the second screen;

wherein the third image is an image obtained by performing second processing on the first image, and the second processing corresponds to a part of editing operations among the group of editing operations comprised in the first processing.

12. The non-transitory computer-readable storage medium according to claim 11, wherein after the displaying the second image on the first screen, and displaying the first image and a third image on the second screen or displaying a third image on the second screen, the computer program, when executed by the processor, further implements:

receiving a second input; and in response to the second input, performing third processing on the second image to obtain a fourth image, displaying the fourth image on the first screen, and displaying at least one of the second image and a fifth image on the second screen;

wherein the fifth image is an image obtained by performing fourth processing on the first image, and the fourth processing is a part of a processing process comprised in at least one of the first processing and the third processing.

13. The non-transitory computer-readable storage medium according to claim 11, wherein the first input comprises at least one of the following:

a sliding operation of dragging the first image to a side of the first screen;

a first sliding operation of dragging the first image to a side of the first screen and a second sliding operation performed in the second screen from a side of the second screen;

a double-click operation performed on the first image;
a single-click operation performed on the first image; and
a long-press operation performed on the first image.

14. The non-transitory computer-readable storage medium according to claim 11, wherein after the in response to the first input, performing first processing on the first image to obtain a second image, displaying the second image on the first screen, and displaying the first image and a third image on the second screen or displaying a third image on the second screen, the computer program, when executed by the processor, further implements:

receiving a third input;
determining a first target image from the second screen in response to the third input; and
displaying, on the first screen, the first target image and a first target processing step corresponding to the first target image.

15. The non-transitory computer-readable storage medium according to claim 11, wherein after the in response to the first input, performing first processing on the first image to obtain a second image, displaying the second image on the first screen, and displaying the first image and a third image on the second screen or displaying a third image on the second screen, the computer program, when executed by the processor, further implements:

receiving a fourth input;
determining a second target image from the second screen in response to the fourth input; and
displaying, in a specified area of the second screen, a second target processing step corresponding to the second target image.

* * * * *